(12) United States Patent
Cao et al.

(10) Patent No.: US 11,433,708 B2
(45) Date of Patent: Sep. 6, 2022

(54) VEHICLE TIRE ASSEMBLY

(71) Applicant: Nissan North America, Inc., Franklin, TN (US)

(72) Inventors: Jinwei Cao, New Hudson, MI (US); Nanzhu Zhao, Novi, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 290 days.

(21) Appl. No.: 16/781,442

(22) Filed: Feb. 4, 2020

(65) Prior Publication Data

US 2021/0237512 A1 Aug. 5, 2021

(51) Int. Cl.
*B60C 7/14* (2006.01)
*F16F 15/00* (2006.01)
*B60C 7/18* (2006.01)
*B60C 7/20* (2006.01)

(52) U.S. Cl.
CPC ............. *B60C 7/146* (2021.08); *B60C 7/18* (2013.01); *F16F 15/005* (2013.01); *B60C 7/20* (2013.01); *F16F 2224/0283* (2013.01)

(58) Field of Classification Search
CPC .. B60C 7/18; B60C 7/20; B60C 7/146; B60C 7/107; B60C 2007/146; B60C 2007/107; F16F 15/005; F16F 2224/0283
See application file for complete search history.

(56) References Cited

U.S. PATENT DOCUMENTS

| 6,959,593 | B2 | 11/2005 | Mancosu et al. |
| 2002/0175594 | A1* | 11/2002 | Kornbluh ......... B60G 17/01941 310/317 |
| 2008/0314486 | A1* | 12/2008 | Manesh ................... B60C 7/00 152/328 |
| 2011/0290394 | A1* | 12/2011 | Luchini ..................... B60C 7/10 152/302 |
| 2013/0192910 | A1* | 8/2013 | Sayre .................... H01L 41/193 180/65.51 |
| 2017/0084817 | A1 | 3/2017 | Navarro et al. |
| 2018/0337417 | A1* | 11/2018 | Kyu ..................... H01M 4/8673 |

FOREIGN PATENT DOCUMENTS

| CA | 2603342 A1 * | 4/2008 | .......... B60C 23/002 |
| KR | 101190822 B1 * | 10/2012 | |
| RU | 167034 U1 * | 12/2016 | |

* cited by examiner

*Primary Examiner* — Kip T Kotter
(74) *Attorney, Agent, or Firm* — Global IP Counselors, LLP (57) ABSTRACT

A vehicle tire assembly having a plurality of flexible spoke portions that extend from an outer annular ring to and inner annular ring. Adjacent pairs of the flexible spoke portions define a plurality of gaps therebetween. A plurality of electro-active members, are disposed radially inward from the outer annular ring and radially outward of the inner ring. The plurality of electro-active members are configured such that in the absence of an electric current flowing therethrough, the plurality of electro-active members flex in response to flexing of the plurality of flexible spoke portions. In the presence of an electric current flowing through the plurality of electro-active members, the plurality of electro-active members become more rigid and less flexible adding corresponding stiffness to the plurality of flexible spoke portions.

16 Claims, 8 Drawing Sheets

VEHICLE TIRE ASSEMBLY

BACKGROUND

Field of the Invention

The present invention generally relates to a vehicle tire assembly. More specifically, the present invention relates to a vehicle tire assembly that includes electro-active members that selectively modify the deformation characteristics of the vehicle tire assembly.

Background Information

Vehicle tire assemblies that are configured to be inflated with pressurized air have predetermined deformation characteristics that can be changed by changing air pressure levels within the tire assemblies. Airless tire assemblies have deformation characteristics that typically cannot be changed.

SUMMARY

One object of the present disclosure is to provide both air pressurized tire assemblies and airless tire assemblies with features that allow changes in deformation characteristics without changing air pressure.

In view of the state of the known technology, one aspect of the present disclosure is to provide a vehicle tire assembly with an outer annular ring, an inner ring, a plurality of flexible spoke portions and a plurality of electro-active members. The plurality of flexible spoke portions extend from the outer annular ring to the inner ring. Adjacent pairs of the flexible spoke portions defining a plurality of gaps therebetween. The outer ring, the inner ring and the plurality of flexible spoke portions define an airless tire section. The plurality of electro-active members are disposed radially inward from the outer annular ring and radially outward of the inner ring. The plurality of electro-active members are configured such that in the absence of an electric current flowing therethrough, the plurality of electro-active members flex in response to flexing of the plurality of flexible spoke portions. In the presence of an electric current flowing through the plurality of electro-active members, the plurality of electro-active members become more rigid and less flexible adding corresponding stiffness to the plurality of flexible spoke portions.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
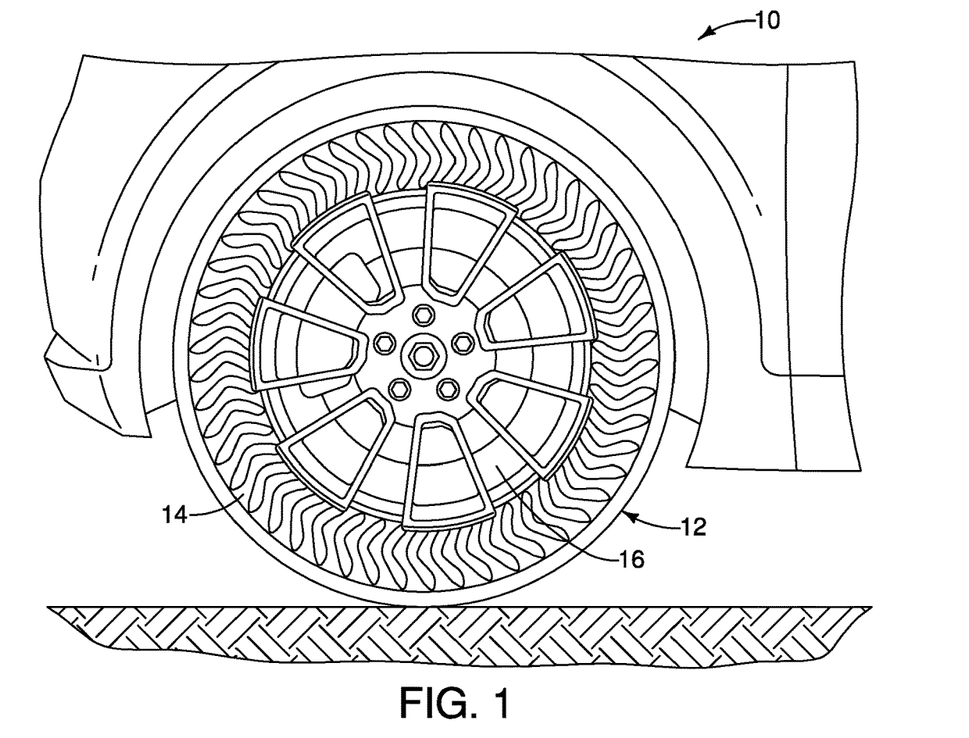
FIG. 1 is a side view of a front area of a vehicle showing a tire assembly in accordance with a first embodiment.

Referring initially to FIG. 1, a vehicle 10 with a vehicle tire assembly 12 (herein after referred to as the tire assembly 12) is illustrated in accordance with a first embodiment.

Figure 2:
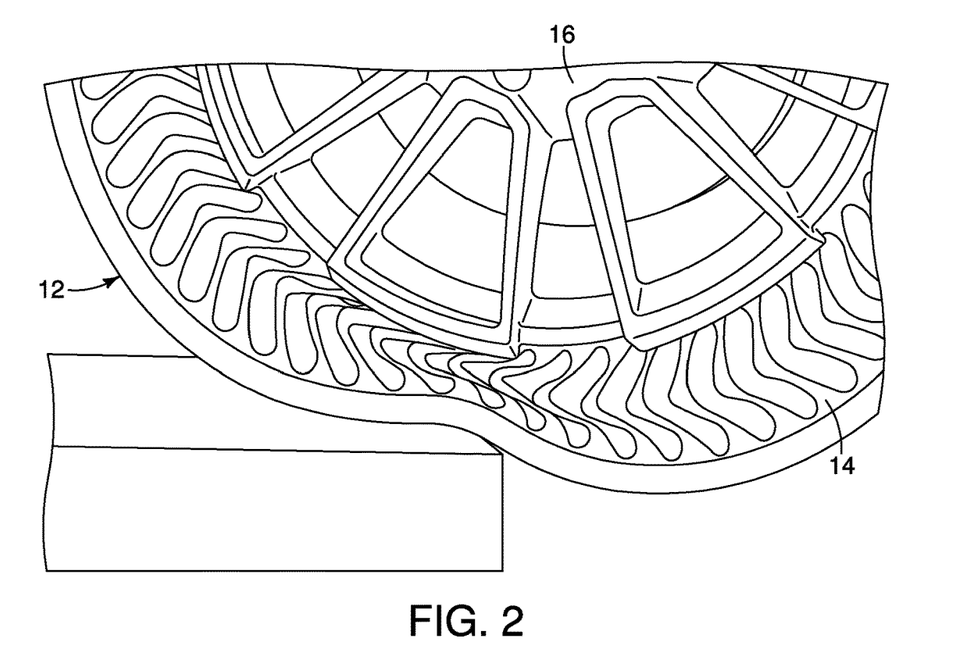
FIG. 2 is another side view showing the tire assembly flexing in response to contacting an obstruction on the road in accordance with a first embodiment.

The tire assembly 12 includes an airless tire section 14 mounted to a rigid rim 16 that is configured for mounting to an axle 18 of the vehicle 10, as shown in FIG. 1. The rigid rim 16 is made of, for example, metal. Alternatively, the rigid rim 14 can be made of non-metallic materials such as, for example, fiberglass. In FIG. 2, the tire assembly 12 is depicted rolling over an obstruction in the road showing flexibility of the tire assembly 12. The flexibility of the corresponds to deformation characteristics of the tire assembly 12.

Figure 3:
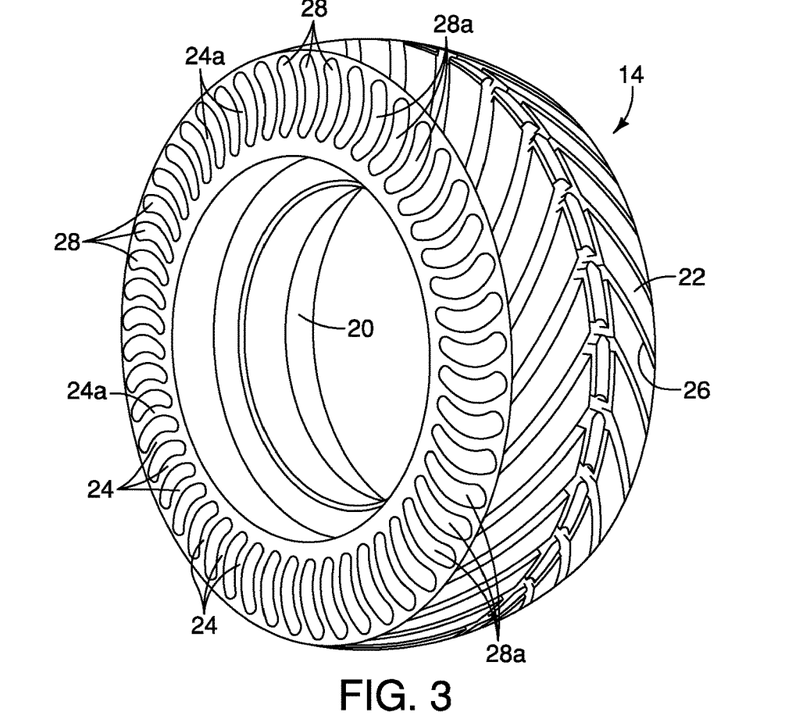
FIG. 3 is a perspective view of the tire assembly showing an inner annular ring, an outer annular ring and a plurality of flexible spoke portions with gaps defined between adjacent pairs of the flexible spoke portions in accordance with a first embodiment.
Figure 4:
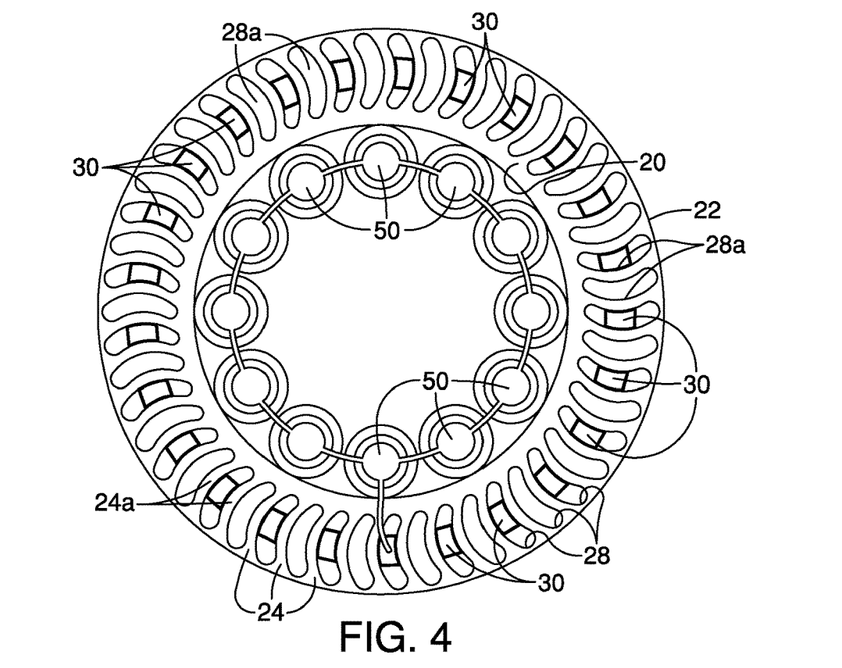
FIG. 4 is schematic side view of the tire assembly showing alternating ones of the gaps with an electro-active member installed therein, and batteries that selectively power the electro-active members being located radially inward from the inner annular ring in accordance with a first embodiment.

As shown in FIGS. 3 and 4, the airless tire section 14 of the tire assembly 12 includes an inner annular ring 20, an outer annular ring 22 and a plurality of flexible spoke portions 24. The inner annular ring 20 is shaped and dimensioned to mount to the rigid rim 16 in a conventional manner. The outer annular ring 22 includes an outer tread surface with a tread pattern 26, as shown in FIG. 3. The deformation characteristic of the tire assembly 12 is in large part due to the shape, size and number of the flexible spoke portions 24. Referring again to FIG. 2, when the tire assembly 12 contacts an obstruction, a majority of resilient deformation occurs at the flexible spoke portions 24. Visibly, the flexible spoke portions 24 in an airless tire have a large effect on the deformation characteristics of the tire assembly 12. The number, spacing, flexibility and size of spoke portions of an airless tire all have an effect on the deformation characteristics of an airless tire. The deformation characteristics of a tire assembly has a corresponding effect on the comfort of the ride experienced by a vehicle passenger.

Each of the plurality of flexible spoke portions 24 extends from the outer annular ring 22 to the inner ring 20. The plurality of flexible spoke portions 24 are spaced apart from one another in a radial direction of the tire assembly such that a gap 28 is defined between each adjacent pairs of the plurality of flexible spoke portions 24. Hence there are a plurality of the gaps 28 in alternating succession relative to the flexible spoke portions 24.

In the depicted first embodiment, the plurality of flexible spoke portions 24 are non-linear in an unflexed state such that the corresponding ones of the plurality of gaps 28 28 therebetween have a corresponding non-linear shape. More specifically, each of the plurality of flexible spoke portions 24 includes a curved section 24a and the corresponding ones of the plurality of gaps 28 therebetween include a corresponding curved section 28a.

The airless tire section 14 further includes a plurality of electro-active members 30. The number of the plurality of electro-active members 30 included and specific locations thereof within the airless tire section 14 depends upon the design of the tire assembly 12 and the specific vehicle or type of vehicle that the tire assembly 12 is installed to. In the depicted first embodiment, the plurality of electro-active members 30 are installed within respective ones of the plurality of gaps 28. For example, as shown in FIG. 4, the plurality of electro-active members 30 are installed in alternating ones of the plurality of gaps 28. In other words, every other gap 28 includes at least one electro-active member 30 and the remaining gaps 28 are left empty.

Put another way, ones of the plurality of electro-active members 30 are disposed in alternating ones of the plurality of gaps 28. In the depicted embodiment, ones of the plurality of electro-active members 30 are disposed in alternating ones of the plurality of gaps 28 at corresponding ones of the curved sections 28a. Alternatively, each and every one of the gaps 28 can be provided with one of the electro-active members 30, as discussed and shown below in the second embodiment. Still further, the electro-active members 30 can alternatively be located within the flexible spoke portions 24, as discussed and shown in the third embodiment below.

As shown in FIG. 4, the plurality of electro-active members 30 are installed to a middle area of the gaps 28 at the curved section 28a thereof. Further, the electro-active members 30 are located radially inward from the outer annular ring 22 and radially outward of the inner ring 20. Alternatively, each of the electro-active members 30 can be the manufactured with the same radial length as the gaps 28 such that the gaps 28 are filled in with the electro-active members 30.

The plurality of electro-active members 30 are configured such that in the absence of an electric current flowing therethrough, the plurality of electro-active members 30 flex in response to flexing of the plurality of flexible spoke portions 24 of the tire assembly 12. Further, in the presence of an electric current flowing through the plurality of electro-active members 30, the plurality of electro-active members become more rigid and less flexible adding corresponding stiffness to the plurality of flexible spoke portions 24.

Figure 5:
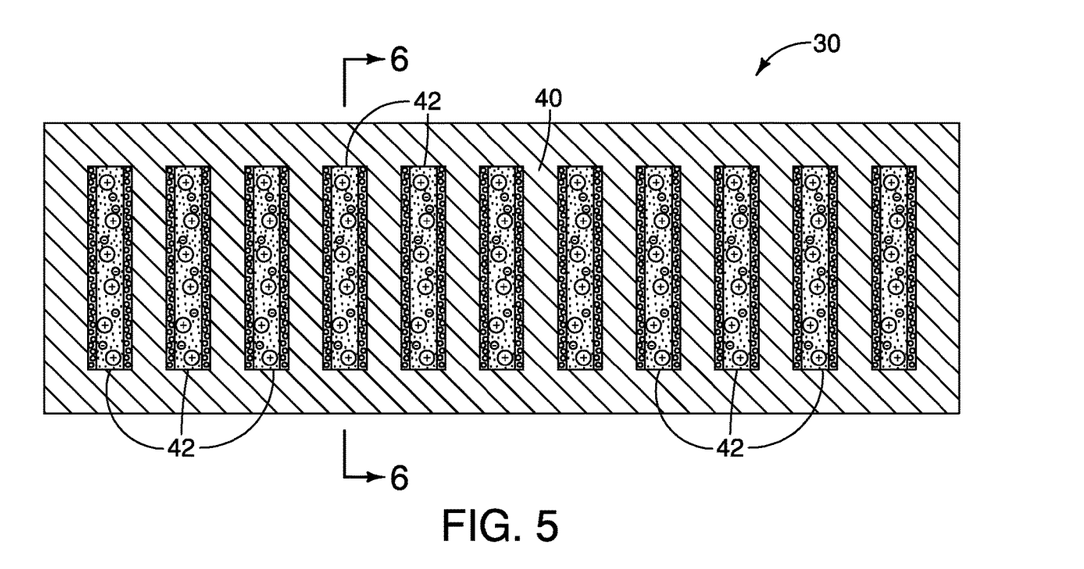
FIG. 5 is schematic side view of one of the electro-active members showing a plurality of electro-active elements embedded within a block of flexible material in accordance with a first embodiment.
Figure 6:
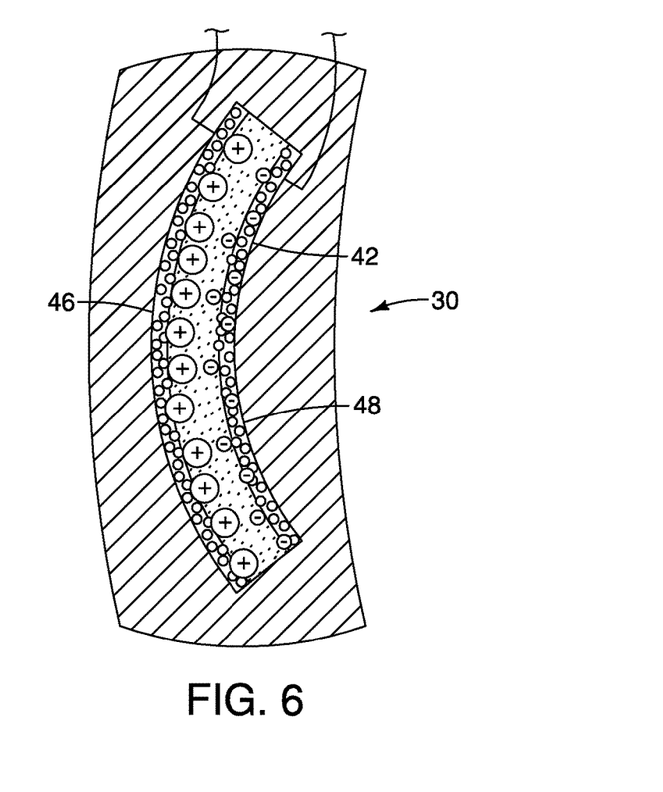
FIG. 6 is a cross-sectional view taken along the line 6-6 in FIG. 5, showing details of one of the electro-active elements embedded within the block of flexible material in accordance with a first embodiment.

FIGS. 5 and 6 show one of the electro-active members 30 removed from the tire assembly 12. Since the electro-active members 30 can be the same, description of one of the electro-active members 30 can apply equally to all of the plurality of electro-active members 30. Therefore, only one of the electro-active members 30 is described hereinbelow for the sake of brevity.

As shown in FIGS. 5 and 6, the electro-active member 30 includes a block of flexible material 40 and a plurality of electro-active elements 42 disposed within the flexible material 40. The flexible material 40 can be rubber, a flexible polymer or resin material. Further, the flexible material 40 can be made of the same, or similar material as the flexible spoke portions 24. Alternatively, the electro-active member 30 can be provided with a single electro-active element 42 that spans the length of the flexible material 40. In the depicted embodiment, there is a plurality of electro-active elements 42. In the depicted embodiment, each of the electro-active elements 42 are the same. Description of one of the electro-active elements 42 applies equally to all. Therefore, only one a plurality of electro-active elements 42 is described herein below for the sake of brevity.

Figure 7:
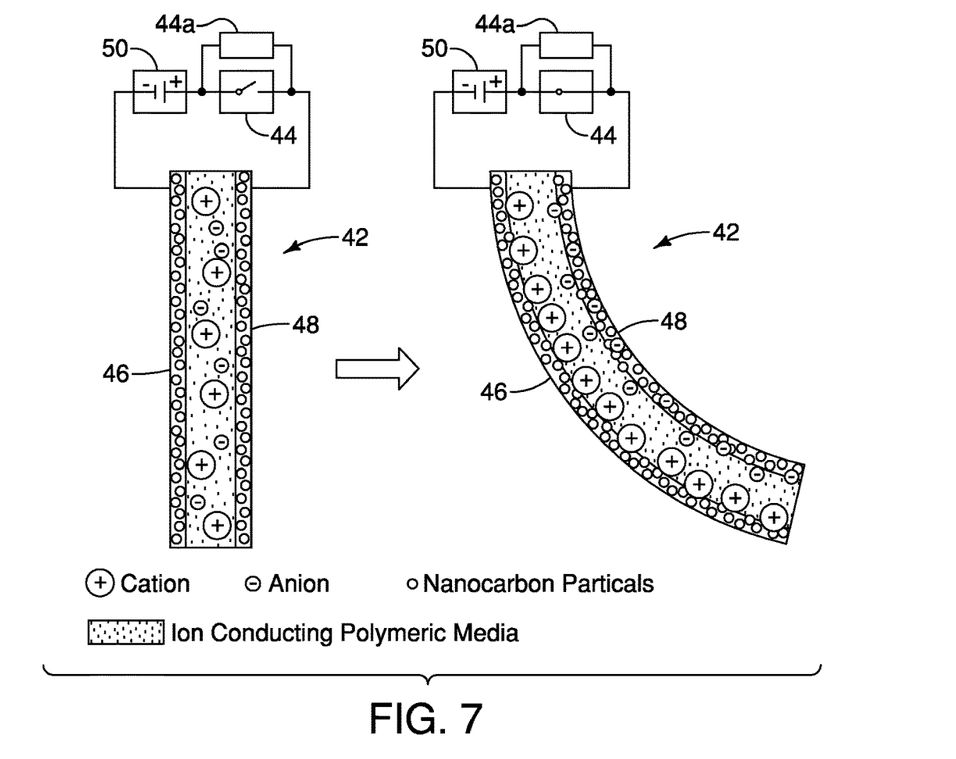
FIG. 7 is schematic view one of the electro-active elements showing the electro-active element on the left without electric current flowing therethrough, and on the right shown with electric current flowing therethrough in accordance with a first embodiment.
Figure 8:
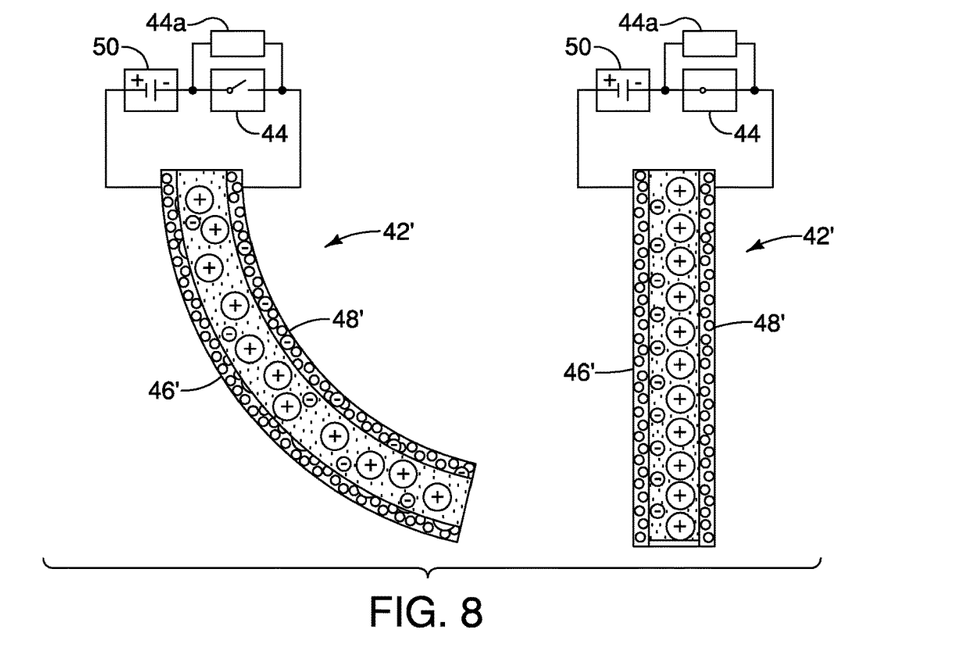
FIG. 8 is another schematic view of a modified one of the electro-active elements showing the electro-active element on the left without electric current flowing therethrough, and on the right shown with electric current flowing therethrough in accordance with a first embodiment.

As shown in FIGS. 7 and 8, the electro-active element 42 includes two electrode layers 46 and 48 that are spaced apart from one another. An on/off switch 44 and charging circuit 44a are connected to the electrode layers 46 and 48 along with one of plurality of batteries 50. Between the electrode layers 46 and 48, there are anions represented by minus symbols (−) within circles and cations represented by plus symbols (+) within circles suspended in an ion conducting polymeric media. As shown in FIG. 7, the electro-active element 42 is designed with specific response characteristics. Specifically, at the left side of FIG. 7, in the absence of electrical current, the electro-active element 42 is straight with the anions and cations being randomly located between the electrode layers 46 and 48, making the electro-active element 42 flexible. However, as shown at the right side of FIG. 7 with electrical current applied (direct current), the cations align and are drawn to the electrode layer 48 and the anions are drawn to the electrode layer 46, bending the electro-active element 42 into a curved orientation and further making the electro-active element 42 rigid. Hence, the plurality of electro-active members 30 includes a plurality of electro-active elements 42 that are flexible in the absence of an electric current flowing therethrough and are rigid the presence of an electric current flowing therethrough.

It should be understood from the drawings and the description herein that the electro-active elements can be configured in any of a variety of orientations. For example, as shown in FIG. 8 in an alternative configuration, in the absence of electrical current, an electro-active element 42' is curved with the anions and cations being randomly located between the electrode layers 46 and 48, making the electro-active element 42' flexible. As shown at the right side of FIG. 8 with electrical current applied (direct current), the cations align and are drawn to the electrode layer 48 and the anions are drawn to the electrode layer 46, bending the electro-active element 42' into a straight orientation and further making the electro-active element 42' rigid. The electro-active members 30 of the tire assembly 12 can be manufactured with either of the configurations shown in FIG. 7 or 8, or combinations thereof, depending upon the desired flexibility and rigidity characteristic desired of the tire assembly 12, and comfort of passengers.

The electro-active elements 42 can include an ionic polymer-metal composite.

The electro-active elements 42 can also include any of the following materials. For example, the electrode layers 46 and 48 provide a flexible shape and form to each of the electro-active elements 42 and can be formed of nanoparticles and other materials.

The electroactive materials between the electrode layers 46 and 48 can be made in any of a variety of ways, and generally includes three parts: an ionic polymer materials group; a dielectric polymer group and a polymer and ceramic composite.

The ionic polymer materials group includes three components: a polymer matrix, a salt and, if necessary, a plasticizer. The polymer matrix, salt and the plasticizer can be made of a combination of two or more polymers, salts and plasticizers, respectively. Possible materials are shown below in Table 1. Each salt is made up of a combination of a cation and an onion.

TABLE 1

| Polymer Matrix Group | Cation Group | Anion Group | Plasticizer Group |
| --- | --- | --- | --- |
| poly(ethylene glycol) diacrylate (PEGDA) poly(ethylene glycol) (PEG) poly(ethylene glycol) dimethylacrylate (PEGDMA) Poly(ethylene glycol) methyl ether acrylate Poly(propylene oxide) Poly(ethylene glycol) -b- poly(propylene glycol) copolymer Polystyrene-b-poly(ethylene oxide) Poly(ethylene oxide) polystyrene copolymer polyacrylonitrile (PAN) Nafion | monovalent ions: $Li^+$, $Na^+$, $K^+$, multivalent ions: $Ca^{2+}$, $Mg^{2+}$, $Mn^{2+}$, $Al^{3+}$, $Fe^{3+}$, $Zr^{4+}$, $Ba^{2+}$ ionic compounds: 1-ethyl-3-methylimidazolium ion, 1-butyl-3-methylimidazolium ion, 1-allyl-3-methylimidazolium ion, 1-butyl-2,3-dimethylimidazolium ion, 1-decyl-3-methylimidazolium ion, 1-hexyl-2,3-dimethylimidazolium ion, 1-hexyl-3-methylimidazolium ion, 1-(2-hydroxyethyl)-3-methylimidazolium ion, 2,3-dimethyl-1-propylimidazolium ion, 1,3-dimethylimidazolium ion, 1-methyl-3-n-octylimidazolium ion, 1-methyl-3-propylimidazolium ion, 1-methyl-3-pentylimidazolium ion), ammonium ions, amyltriethylammonium ion, butyltrimethylammonium ion, ethyl(2-methoxyethyl)dimethylammonium ion, tetrabutylammonium ion), pyridinium ions, 1-butylpyridinium ion, 1-butyl-4-methylpyridinium ion), pyrrolidinium ions (1-butyl-1-methylpyrrolidinium ions, 1-ethyl-1-methylpyrrolidinium ions, 1-methyl-1-propylpyrrolidinium ions), phosphonium ions | $Cl^-$, $AsF_6^-$, $PF_6^-$, $BF_4^-$, $ClO_4^-$, $CF_3SO_2^-$, $[N(C_2F_5SO_2)_2]^-$ $[N(C_4F_9SO_2)(CF_3SO_2)]^-$ $[N(CF_3SO_2)_2]^-$, $BOB^-$, $BF_6^-$, $NO_3^-$, $Al_2Cl_7^-$, $Al_3Cl_{10}^-$, $AlCl_4^-$ | Nitriles: succinonitrile, glutaronitrile, adiponitrile, octyl-2-cyanoacrylate. Carbonates: propylene carbonate, ethylene carbonate, 1,2-butylene carbonate, dimethyl carbonate, water. |

Possible materials for the dielectric polymers group are listed below:
  polyvinylidene fluoride (PVDF), polyvinylidene fluoride-trifluoroethylene (PVDF-TrFE)
  Polyvinylidene chloride, polyacrylonitrile, polyvinyl acetate, polyphenylethernitrile, nylon.
  Liquid crystal polymers, polymer dispersed liquid crystal.
In the Polymer and ceramic composite, the polymer provides the mechanical support and the ceramic particles should be piezoelectric. A list of possible materials is provided below in Table 2.

TABLE 2

| Polymer Matrix Group | Piezoelectric Ceramic |
| --- | --- |
| Polybutadiene Copolymer of isobutylene and isoprene Isoprene rubber Synthetic rubber - styrene-butadiene Nitrile-butadiene rubber Polyurethane Silicone Dimethylsilicone Polydimethylsiloxane | lead zirconate titanate (PZT), Barium titanate, Bismuth titanate, Sodium potassium niobate, Zinc oxide, Potassium niobate, Quartz, Lead titanate. |

The tire assembly 12 further includes at least one battery 50, and optionally a plurality of batteries 50 disposed within the tire assembly 12. In FIG. 4, a plurality of batteries are depicted radially inward of the inner annual ring 20. It should be understood from the drawings and the description herein that the batteries 50 are not drawn to scale and are included in FIG. 4 as a representation of batteries. More specifically, the battery 50 or batteries 50 included within the tire assembly 12 are dimensioned to be retained radially outward of the rigid rim 16 and radially inward of the plurality of flexible spoke portions 24. Further the batteries can be embedded within the inner annular ring 20 or be installed between the rigid rim 16 and the inner annular ring 20. Still further, the batteries 50 can be retained in pockets (not shown) formed in the inner annular ring 20.

The batteries 50 are electrically connected to the electro-active members 30 via wires and can be connected to and disconnected from the electro-active members 30 via switches 44 (shown in FIGS. 7 and 8) that are wirelessly controlled by an electronic controller 52 as is described in greater detail below. Each switch 44 is wired in parallel to the electro-active members 30 along with the charging circuit 44a. The charging circuits 44a are configured such that when the switch 44 is open (off) the charging circuit 44a provides electric current generated via a piezoelectric effect by the electro-active members 30 to the batteries 50.

Figure 9:
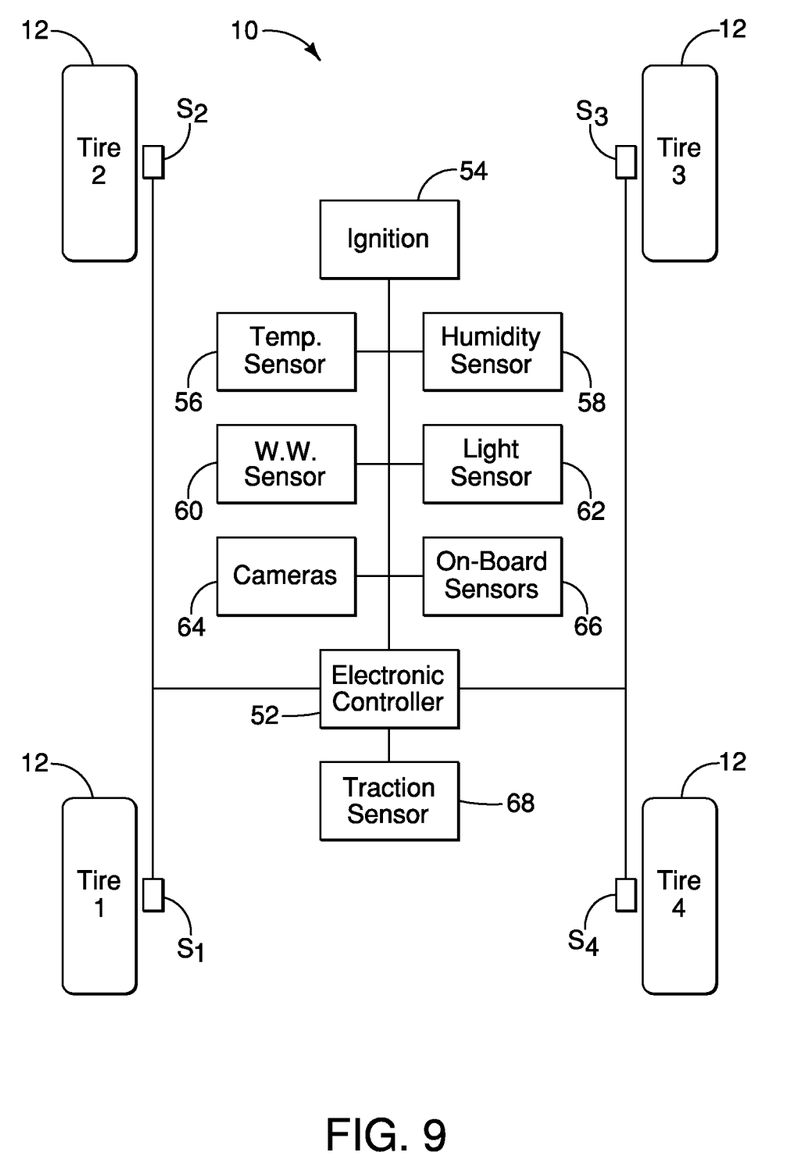
FIG. 9 is a block diagram of a control system with an electronic controller connected to various sensors, the electronic controller being configured to activate and shut off the electro-active elements in response to information received from the various sensors attached thereto in accordance with the first embodiment.

As shown in FIG. 9, the electronic controller 52 can be directly connected to at least one of the following, several of the following or all of the following, depending upon the design and configuration of the vehicle 10: an ignition switch 54 of the vehicle 10, a temperature sensor 56 mounted to the vehicle 10 to measure ambient temperature outside of the vehicle 10, a humidity sensor 58 mounted to the vehicle 10 to measure ambient humidity outside of the vehicle 10, a windshield wiper sensor 60 that detects whether or not the windshield wipers (not shown) are on or not; a headlight sensor 62 that detects whether or not the headlights (not shown) are on; vehicle cameras 64 that view areas surrounding the vehicle 10; various on-board sensors 66 detecting conditions within the vehicle 10; traction sensor(s) 68 that detect drive train conditions resulting from traction irregularities in the tires relative to the road; and a plurality of tire sensors, such as tire sensor $S_1$, tire sensor $S_2$, tire sensor $S_3$ and tire sensor $S_4$. If the tire assemblies 12 are inflatable tires, then the tire sensors $S_1$, $S_2$, $S_3$ and $S_4$ can be configured to detect air pressure within the adjacent tire. The tire sensors $S_1$, $S_2$, $S_3$ and $S_4$ also include wireless communication devices that can communicate wirelessly with the switches between the batteries 50 and the electro-active elements 42. The tire sensors $S_1$, $S_2$, $S_3$ and $S_4$ can be instructed by the electronic controller 52 to provide power from the batteries 50 to sub-groups of the electro-active elements 42 or all of the electro-active elements 42. Further, the tire sensors $S_1$, $S_2$, $S_3$ and $S_4$ can be instructed by the electronic controller 52 to cease providing power from the batteries 50 to sub-groups of the electro-active elements 42 or all of the electro-active elements 42.

The electronic controller 52 operates as follows. During normal driving operation, electronic controller 52 can communicate via the tire sensors $S_1$, $S_2$, $S_3$ and $S_4$ with the tire assemblies 12 such that some or all of the plurality of electro-active members 30 can be activated such that the tire assemblies 12 become more rigid and less flexible. Further, sub-groups, selected ones of or all of the electro-active elements 42 can be operated or shut off.

In this normal driving state, the tire assemblies 12 are tuned to provide a smooth ride and provide an optimal fuel efficiency. However, if the electronic controller 52 detects a potential road problem via one or more of the sensors attached thereto, the electronic controller 52 can alter the current operating status of the electro-active elements 42. For example, if the windshield wiper sensor 60 detects operation of the windshield wipers (not shown) beyond a minimum time period (for example, more than a minute) or the traction sensor 68 detects wheel slippage, the electronic controller 52 can alter the status of the electro-active elements 42 by turning some or all of the electro-active elements 42 off (cutting off power thereto). Traction is improved with the corresponding increase in flexibility and deformability of the tire assembly 12, thereby making vehicle operation more secure.

When some or all of the electro-active elements 42 are switched off (no electric current) it is then possible for the electro-active elements 42 to experience a piezoelectric effect wherein deformation of the tire assembly 12 and corresponding bending or deformation of the electro-active elements 42 occurs, the electro-active elements 42 produce electric current that can be used to charge the batteries 50.

Other sensors attached to the electronic controller 52 detect other conditions that can cause the electronic controller 52 to change the operating status of the electro-active elements 42, thereby changing the rigidity and deformation characteristics of the tire assemblies 12.

Figure 10:
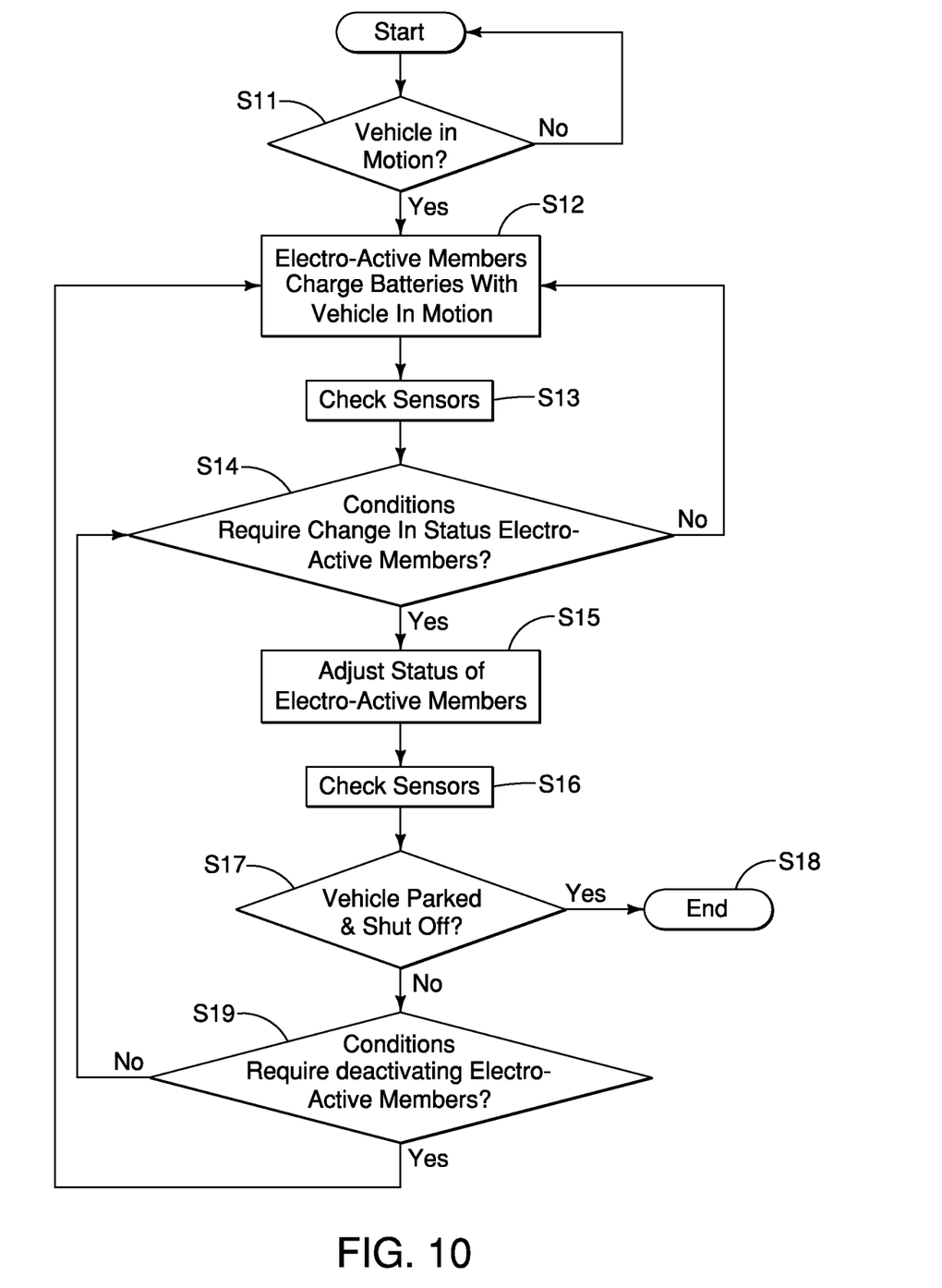
FIG. 10 is a flowchart showing one example of logic that is used by the electronic controller shown in FIG. 9, in accordance with the first embodiment.

FIG. 10 depicts a flowchart with one example of logic that can be utilized by the electronic controller 52 and is described below.

At the top of FIG. 10, when the ignition switch 54 is operated to start the engine (not shown) of the vehicle 10, the logic shown in FIG. 10 starts. At step S11, the electronic controller 52 determines whether or not the vehicle 10 is in motion. If not, operation returns to start. If yes, then operation moves to step S12. As step S12 the electronic controller 52 allows the electro-active members top initially experience the piezoelectric effect and provide a charge to the batteries 50. Thereafter, at step S13 the electronic controller 52 checks the status of all sensors connected thereto.

At step S14, the electronic controller 52 determines whether or not vehicle operation conditions have changed and hence, whether or not a change in the status of the electro-active members 30 is necessary. For example, if the windshield wipers are on, the sensor 60 provides that indication which can mean rain or snow. If the traction sensor 68 detects abnormalities in tire traction, the electronic controller 52 receives such information. If the cameras 64 or on-board sensors 66 detect off-road driving conditions, the electronic controller 52 is provided with such information. If the temperature sensor 56 and/or humidity sensor 58 detects possible inclement weather, such as rain, snow, fog or ice, the electronic controller 52 receives such information.

At step S14, if the electronic controller 52 determines that no change in status of the electro-active members 30 is necessary, then operation returns to step S12. At step S14, if the electronic controller 52 determines that a change in status of the electro-active members 30 is necessary, then operation moves to step S15. At step S16, the electronic controller 52 again checks the status of the sensors. Next at step S17, the electronic controller 52 determines whether or not the engine is shut off and the vehicle is parked. If yes, operation moves to step S18 ending the logic. If the electronic controller 52 determines that the engine is still running, then operation moves to step S19.

At step S19, the electronic controller 52 determines whether or not sensor detected condition are such that the electro-active members 30 should be deactivated (electrical current shut off). If yes, operation returns to step S12 where the electro-active members 30 are shut off and can charge the batteries 50. If no, then operation moves to step 514.

It should be understood from the drawings and the description herein that the electronic controller 52 preferably includes a microcomputer with a vehicle tire assembly control program that controls the operation of the electro-active elements 42, as discussed above. The electronic controller 52 can also include other conventional components such as an input interface circuit, an output interface circuit, and storage devices such as a ROM (Read Only Memory) device and a RAM (Random Access Memory) device. The microcomputer of the electronic controller 52 is programmed to control the tire assemblies (and electromechanical elements 42) in response to the various inputs from the sensors shown in FIG. 9.

Second Embodiment

Figure 11:
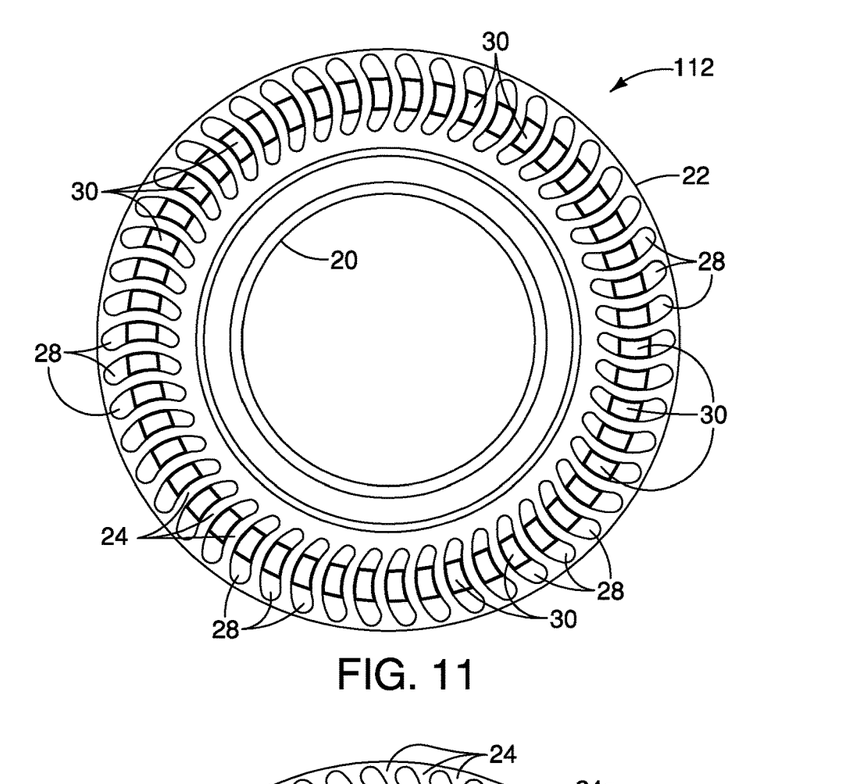
FIG. 11 is a side view of a tire assembly in accordance with a second embodiment.

Referring now to FIG. 11, a tire assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the tire assembly 112 is identical to the tire assembly 12 of the first embodiment, except that every gap 28 includes a corresponding electro-active member 30.

Third Embodiment

Figure 12:
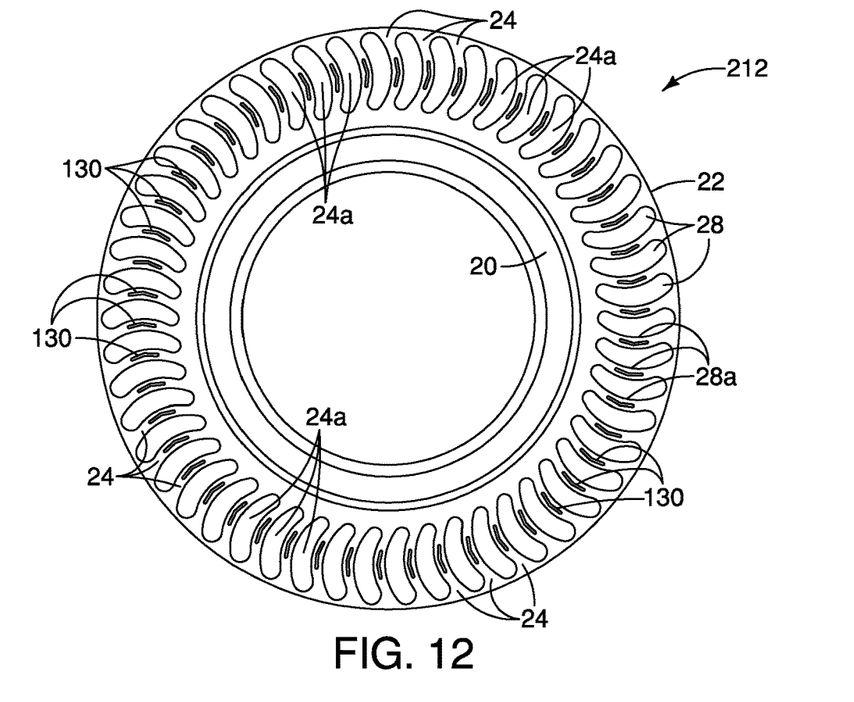
FIG. 12 is a side view of a tire assembly in accordance with a third embodiment.

Referring now to FIG. 12, a tire assembly 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the tire assembly 212 is identical to the tire assembly 12 of the first embodiment, except the electro-active members 30 have been removed from the gaps 28. Instead, electro-active members 130 are present in the flexible spoke portions 24. In other words, the plurality of electro-active members 130 are embedded within corresponding ones of the plurality of flexible spoke portions 24.

Fourth Embodiment

Figure 13:
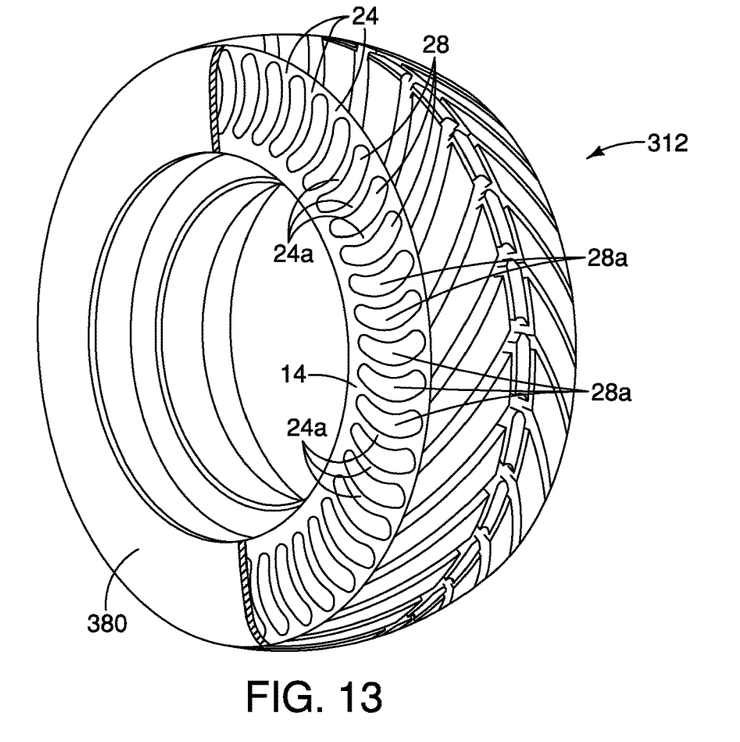
FIG. 13 is a perspective view of a tire assembly in accordance with a fourth embodiment.
Figure 14:
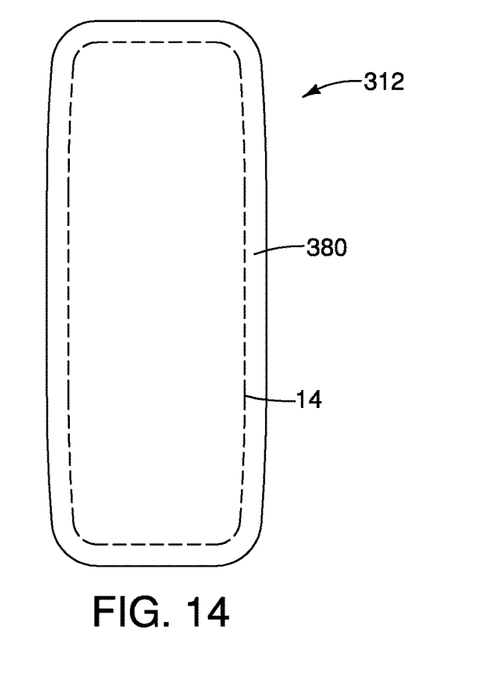
FIG. 14 is an end view of the tire assembly in accordance with the fourth embodiment.

Referring now to FIGS. 13 and 14, a tire assembly 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the tire assembly 312 has been modified such that the airless tire section 14 (the inner annular ring 20, the outer annular ring 22 and the plurality of flexible spoke portions 24) has been modified to include air retaining structures or portions 380. Although not visible in FIGS. 13 and 14, the tire assembly 312 includes the plurality of electro-active members 30 as described above in the first embodiment.

The air retaining sections 380 (one on each side of the tire assembly 312) are attached to the outer annular ring 22 and the inner annular ring 20 such that the air retaining sections 380 and the airless tire section 14 are inflatable.

The vehicle 10 and its components (other than the tire assemblies 12 and the features of the electronic controller 52 described above) are conventional components that are well known in the art. Since such vehicle features and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle tire assembly. Accordingly, these terms, as utilized to describe the present invention should be interpreted relative to a vehicle equipped with the vehicle tire assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle tire assembly, comprising:
    an outer annular ring;
    an inner ring;
    a plurality of flexible spoke portions that extend from the outer annular ring to the inner ring, adjacent pairs of the flexible spoke portions defining a plurality of gaps therebetween, the outer ring, the inner ring and the plurality of flexible spoke portions defining an airless tire section; and
    a plurality of electro-active members, each of the plurality of electro-active members being disposed in alternating ones of the plurality of gaps radially inward from the outer annular ring and radially outward of the inner ring, the plurality of electro-active members being configured such that in the absence of an electric current flowing therethrough, the plurality of electro-active members flex in response to flexing of the plurality of flexible spoke portions, and in the presence of an electric current flowing through the plurality of electro-active members, the plurality of electro-active members become more rigid and less flexible adding corresponding stiffness to the plurality of flexible spoke portions.

2. The vehicle tire assembly according to claim 1, wherein the plurality of flexible spoke portions are non-linear in an unflexed state such that the corresponding ones of the plurality of gaps therebetween have a non-linear shape.

3. The vehicle tire assembly according to claim 2, wherein corresponding ones of the plurality of electro-active members are disposed in corresponding ones of each of the plurality of gaps.

4. The vehicle tire assembly according to claim 2, wherein each of the plurality of flexible spoke portions includes a curved section and the corresponding ones of the plurality of gaps therebetween include a corresponding curved section.

5. The vehicle tire assembly according to claim 4, wherein corresponding ones of the plurality of electro-active members is disposed in each corresponding one of the plurality of gaps at corresponding ones of the curved sections.

6. The vehicle tire assembly according to claim 1, further comprising
a rigid rim configured for mounting to a vehicle, the inner ring being mounted to the rigid rim, and
at least one battery disposed within the airless tire section at a location proximate to the rigid rim configured to selectively provide electric current to the plurality of electro-active members.

7. The vehicle tire assembly according to claim 6, further comprising
the at least one battery includes a plurality of batteries disposed within the airless tire section at locations adjacent to the rigid rim spaced apart from a center of the rigid rim.

8. The vehicle tire assembly according to claim 6, wherein each of the plurality of electro-active members includes at least one electro-active element that is flexible in the absence of an electric current flowing therethrough and is rigid the presence of an electric current flowing therethrough.

9. The vehicle tire assembly according to claim 8, wherein each of the plurality of electro-active members includes a plurality of electro-active elements that are flexible in the absence of an electric current flowing therethrough and are rigid in the presence of an electric current flowing therethrough.

10. The vehicle tire assembly according to claim 6, further comprising
an electronic controller wirelessly connected to at least one battery, the electronic controller being configured to switch on thereby supplying electric current to the plurality of electro-active members and configured to switch off thereby not supplying electric current to the plurality of electro-active members.

11. The vehicle tire assembly according to claim 6, wherein
the rigid rim is made of metal.

12. The vehicle tire assembly according to claim 1, wherein
the outer annular ring includes an outer tread surface.

13. The vehicle tire assembly according to claim 1, wherein
each of the plurality of electro-active members includes at least one electro-active element that is flexible in the absence of an electric current flowing therethrough and is rigid the presence of an electric current flowing therethrough.

14. The vehicle tire assembly according to claim 1, wherein
corresponding ones of the plurality of electro-active members are disposed in corresponding ones of each of the plurality of gaps.

15. A vehicle tire assembly, comprising:
an outer annular ring;
an inner ring;
a plurality of flexible spoke portions that extend from the outer annular ring to the inner ring, adjacent pairs of the flexible spoke portions defining a plurality of gaps therebetween, the outer ring, the inner ring and the plurality of flexible spoke portions defining an airless tire section; and
a plurality of electro-active members, each of the plurality of electro-active members are embedded within corresponding ones of the plurality of flexible spoke portions radially inward and spaced apart from the outer annular ring, radially outward and spaced apart from the inner ring, the plurality of electro-active members being configured such that in the absence of an electric current flowing therethrough, the plurality of electro-active members flex in response to flexing of the plurality of flexible spoke portions, and in the presence of an electric current flowing through the plurality of electro-active members, the plurality of electro-active members become more rigid and less flexible adding corresponding stiffness to the plurality of flexible spoke portions.

16. A vehicle tire assembly, comprising
an outer annular ring;
an inner ring;
a plurality of flexible spoke portions that extend from the outer annular ring to the inner ring, adjacent pairs of the flexible spoke portions defining a plurality of gaps therebetween, the outer ring, the inner ring and the plurality of flexible spoke portions defining an airless tire section;
air retaining sections attached to the outer annular ring and the inner ring such that the air retaining sections are inflatable; and
a plurality of electro-active members, each of the plurality of electro-active members being disposed radially inward from the outer annular ring and radially outward of the inner ring, the plurality of electro-active members being configured such that in the absence of an electric current flowing therethrough, the plurality of electro-active members flex in response to flexing of the plurality of flexible spoke portions, and in the presence of an electric current flowing through the plurality of electro-active members, the plurality of electro-active members become more rigid and less flexible adding corresponding stiffness to the plurality of flexible spoke portions.

* * * * *